United States Patent
Kondo et al.

(10) Patent No.: US 6,674,565 B2
(45) Date of Patent: Jan. 6, 2004

(54) TRAVELLING WAVE-TYPE OPTICAL MODULATOR

(75) Inventors: Atsuo Kondo, Okazaki (JP); Jungo Kondo, Aichi (JP); Kenji Aoki, Ogaki (JP); Osamu Mitomi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/911,862

(22) Filed: Jul. 24, 2001

(65) Prior Publication Data

US 2002/0048076 A1 Apr. 25, 2002

(30) Foreign Application Priority Data

Jul. 27, 2000 (JP) ........................................ 2000-226425

(51) Int. Cl.[7] .............................. G02F 1/00; G02F 1/035
(52) U.S. Cl. ....................... 359/322; 359/244; 359/245; 385/2; 385/8; 385/14; 385/15; 385/39; 385/40
(58) Field of Search ................................ 385/1–3, 418, 385/9, 14, 15, 16, 24, 27, 31, 39, 40, 41, 130, 131, 132; 359/322, 244, 245

(56) References Cited

U.S. PATENT DOCUMENTS 5,408,566 A * 4/1995 Eda et al. ..................... 385/31
5,655,041 A * 8/1997 Forrest et al. ................ 385/49
6,219,469 B1 * 4/2001 Minakata et al. ............. 385/2

FOREIGN PATENT DOCUMENTS

| EP | 1 020 754 A1 | 7/2000 |
| JP | 3-229214 | 10/1991 |
| JP | 6-51254 | 2/1994 |
| JP | 10133159 A | 5/1998 |

OTHER PUBLICATIONS

Abe, Nancy M., Marcos A. R. Franco and Angelo Passaro, "Analysis of a x–cut Ti:LiNbO$_3$ Electrooptic Modulator with a Ridge Structure," p 144–8.

* cited by examiner

Primary Examiner—Hung Xuan Dang
Assistant Examiner—Tuyen Tra
(74) Attorney, Agent, or Firm—Burr & Brown

(57) ABSTRACT

A travelling wave-type optical modulator has a supporting substrate and a ferroelectric single crystalline layer on the supporting substrate. The ferroelectric single crystalline layer has thicker parts and thinner parts within the modulating region of the travelling wave-type optical modulator when viewed in the cross section of the modulating region. An optical waveguide is formed in the thicker part of the ferroelectric single crystalline layer, and electrodes for modulation are provided on the thinner part of the ferroelectric single crystalline layer between the adjacent thicker parts.

28 Claims, 10 Drawing Sheets

TRAVELLING WAVE-TYPE OPTICAL MODULATOR

BACKGROUND OF THE INVENTION

1. Field of the Invention:

This invention relates to a travelling wave-type optical modulator.

2. Related Art Statement:

The inventors disclosed in Japanese Laid-open publication Kokai Hei 10-133159(JPA 10-133159) that if the part under an optical waveguide of a substrate to construct a travelling wave-type optical modulator can be reduced up to e.g. 10 $\mu$m or below, the optical modulator can be operated at a frequency of 10 GHz or more without a buffer layer made of silicon oxide or the like. In this case, thicker parts and thinner parts are formed in the substrate, and as a result, the travelling wave-type optical modulator can be operated at a high speed and repressed in DC drift. Moreover, the product (V$\pi$·L) of operating voltage V$\pi$ by electrode length L in the optical modulator can be favorably decreased.

Then, the inventors made an attempt to develop the performances of the above optical modulator, and discovered the following problem. That is, in the case of connecting the above optical modulator to an external optical fiber, the optical insertion loss was increased. Moreover, it is desired that the product (V$\pi$·L) is more decreased with keeping the velocity matching for microwave signal and the impedance matching for an external circuit.

SUMMARY OF THE INVENTION

It is an object of the present invention, in a travelling wave-type optical modulator including a substrate made of a ferroelectric single crystal having thicker and thinner parts, to decrease the optical insertion loss with keeping the velocity matching for microwave signal and the impedance matching for an external circuit.

It is another object of the present invention, in a travelling wave-type optical modulator including a substrate made of a ferroelectric single crystal having thicker and thinner parts, to greatly decrease the product (V$\pi$·L) of operating voltage V$\pi$ by electrode length L with keeping the velocity matching for microwave signal and the impedance matching for an external circuit.

The present invention is a travelling wave-type optical modulator including a supporting substrate having a ferroelectric single crystalline layer positioned thereon. The ferroelectric single crystalline layer includes thicker and thinner parts within the modulating region of the travelling wave-type optical modulator when viewed in the cross section of the modulating region. An optical waveguide is formed in the thicker part of the ferroelectric single crystalline layer. Electrodes for modulation are provided on the thinner parts of the ferroelectric single crystalline layer between the adjacent thicker parts.

A method for manufacturing the travelling wave-type optical modulator of the present invention, includes the following steps. A substrate made of a ferroelectric single crystalline material is prepared and an optical waveguide is formed in the substrate. The substrate is adhered to another supporting substrate and processed to have thicker and thinner parts, when viewed in the cross section of the modulating region, within the modulating region of the travelling wave-type optical modulator. The optical waveguide is positioned in the thicker part of the substrate. Electrodes are provided for modulation, each being positioned on the thinner parts between the adjacent thicker parts of the ferroelectric single crystalline layer.

According to the above travelling wave-type optical modulator, the optical insertion loss can be decreased while keeping the velocity matching for microwave signal and the impedance matching for an external circuit as described below.

The optical waveguide can be formed in any area within the thicker part of the ferroelectric single crystalline layer. Preferably, the optical waveguide is formed in an upper area of the thicker part or a lower part thereof adjacent to the supporting substrate. If the waveguide is formed in the lower area, the product (V$\pi$·L) can be decreased more effectively.

In a preferred embodiment of the present invention, the supporting substrate includes a base substance made of a hard material and an adhesive layer on the base substance. As the hard material, a ferroelectric single crystal as described below, a glass material and a resin material are exemplified. The adhesive layer may be made of a glass material having lower dielectric constant and an operation temperature of about 600° C. or below. Concretely, solder glass made of plural glass materials such as silicon oxide, lead oxide, aluminum oxide, magnesium oxide, calcium oxide, and boron oxide is exemplified.

As the resin material, room temperature-cured resin, heat-cured resin or ultraviolet-cured resin are exemplified. The resin materials also preferably have lower dielectric constants.

Another aspect of this invention relates to a travelling wave-type optical modulator including a supporting substrate having ferroelectric single crystalline portions positioned on the supporting substrate, each being separated within the modulating region of the travelling wave-type optical modulator when viewed in the cross section of the modulating region. An optical waveguide is formed in the ferroelectric single crystalline portion, and electrodes are provided for modulation, each being provided between the adjacent ferroelectric single crystalline portions on the supporting substrate.

A method for manufacturing the above travelling wave-type optical modulator includes the following steps. A substrate made of a ferroelectric single crystalline material is prepared and an optical waveguide is formed in the substrate. The substrate is adhered to another supporting substrate and processed to fabricate ferroelectric single crystalline portions, each being separated, when viewed in the cross section of the modulating region, within the modulating region of the travelling wave-type optical modulator. As such, the optical waveguide is positioned in the ferroelectric single crystalline portion. Electrodes are provided for modulation, each being positioned between the adjacent ferroelectric single crystalline portions.

According to the above travelling wave-type optical modulator, the product (V$\pi$·L) of operating voltage V$\pi$ by electrode length L can be much decreased while keeping the velocity matching for microwave signal and the impedance matching for an external circuit, as described below.

Although the configuration of each ferroelectric single crystalline part is not restricted, it is required that the adjacent ferroelectric single crystalline portions are separated from one another, and the electrodes are formed in the spaces between the adjacent ferroelectric single crystalline portions. Moreover, it is desired that the ferroelectric single crystalline portion is constructed to have a bottom surface adjacent to the supporting substrate, a top surface opposite to the supporting substrate and side surfaces positioned between the bottom surface and the top surface. In this case, each electrode is arranged so as to be contacted with the opposing side surfaces of the adjacent ferroelectric single crystalline parts. Moreover, it is preferable that the top surface is parallel to the bottom surface.

Particularly, in this case, it is desired that each electrode is contacted with the top surfaces of the adjacent ferroelectric single crystalline portions.

The optical waveguide may be formed in any area within the ferroelectric single crystalline portion. For example, the optical waveguide may be formed in the upper area or the lower area of the ferroelectric single crystalline portion. If the optical waveguide is formed in the lower area, the product (V$\pi$·L) of operating voltage V$\pi$ by electrode length L can be greatly decreased.

In the above travelling wave-type optical modulator, the supporting substrate preferably includes a base substance made of a hard material and an adhesive layer on the base substance. As the hard material, a ferroelectric single crystal, a glass material and a resin material are exemplified, as mentioned above. The adhesive layer may be also made of the above-mentioned solder glass. Moreover, the supporting substrate may be made of a glass material or a resin material entirely.

The ferroelectric single crystalline portion is made of any material used in the known travelling wave-type optical modulator, and concretely, lithium niobate, potassium lithium niobate, lithium tantalate and KTP are exemplified. Preferably, at least one of lithium niobate, lithium tantalate and lithium niobate-lithium tantalate solid solution single crystal is employed.

BRIEF DESCRIPTION OF THE DRAWINGS

For a better understanding of this invention, reference is made to the attached drawings, wherein.

DETAILED DESCRIPTION OF THE INVENTION

This invention is described in detail hereinafter, with reference to the attached drawings.

FIGS. 1(a)–(d) and FIG. 2(a)–(c) are cross sectional views schematically showing the manufacturing steps for a travelling wave-type optical modulator according to the present invention.

Figure 1A:
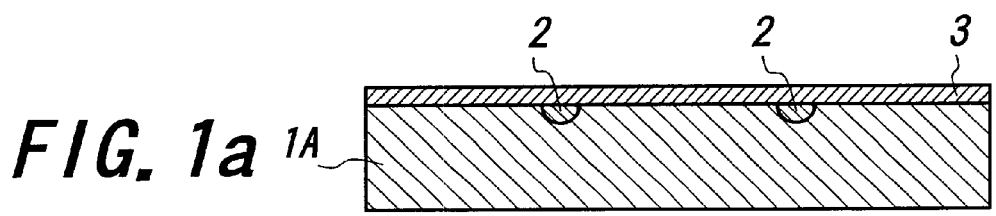
FIGS. 1(a)–(d) are cross sectional views schematically showing the manufacturing steps for a travelling wave-type optical modulator according to the present invention.

First of all, as shown in FIG. 1(a), optical waveguides 2 are formed in a substrate 1A made of an X-cut ferroelectric single crystal such that the long directions of the optical waveguides 2 are parallel to the Y-direction of the substrate. Therefore, a given TE mode optical wave travels through each optical waveguide in a direction parallel to the Y-direction of the substrate 1A.

Figure 1B:
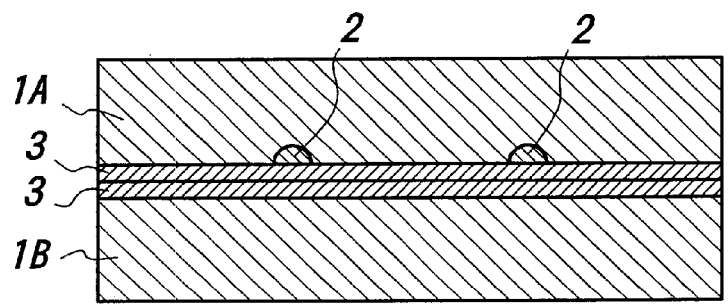
Figure 1C:
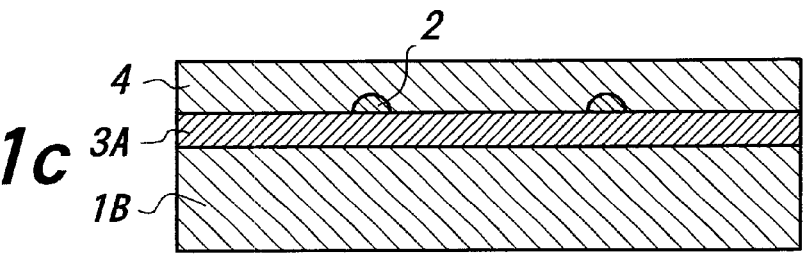
Figure 1D:
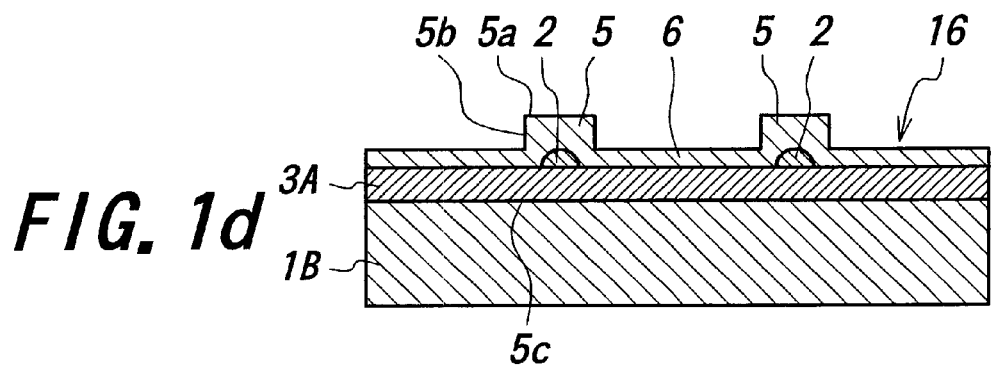

Then, an adhesive layer 3 is formed on the substrate 1A. A supporting substrate 1B is prepared, and another adhesive layer 3 is formed on the supporting substrate 1B. Then, as shown in FIG. 1(b), the adhesive layers 3 are brought into contact with each other, and thermally treated under a given load being applied thereto. As a result, the substrate 1A and the supporting substrate 1B are adhered. Numeral reference 3A designates an adhesive layer made of the bonded adhesive layers 3. Then, the substrate 1A is ground and polished to fabricate a thinner ferroelectric single crystalline layer 4, as shown in FIG. 1(c). Subsequently, the ferroelectric single crystalline layer 4 is etched by photolithography using a given mask, and thus, a ferroelectric single crystalline layer 16 is formed to have thicker parts 5 and thinner parts 6. Numeral references 5a, 5b and 5c denote the top surface, the side surface and the bottom surface of the thicker part 5, respectively.

Figure 2A:
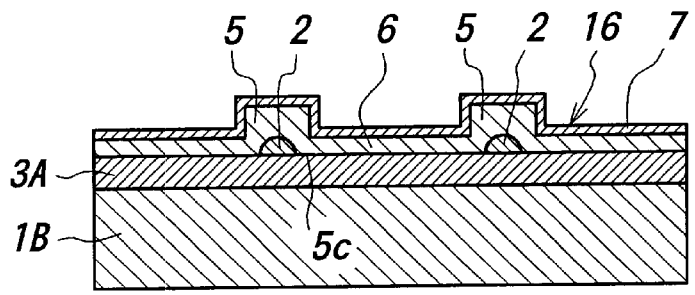
FIGS. 2(a)–(c) are cross sectional views schematically showing the manufacturing steps subsequent to FIGS. 1(a)–(d) for the travelling wave-type optical modulator in accordance with the present invention.
Figure 2B:
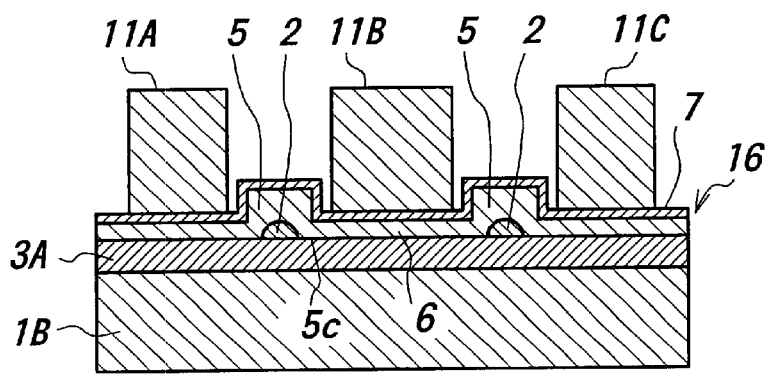
Figure 2C:
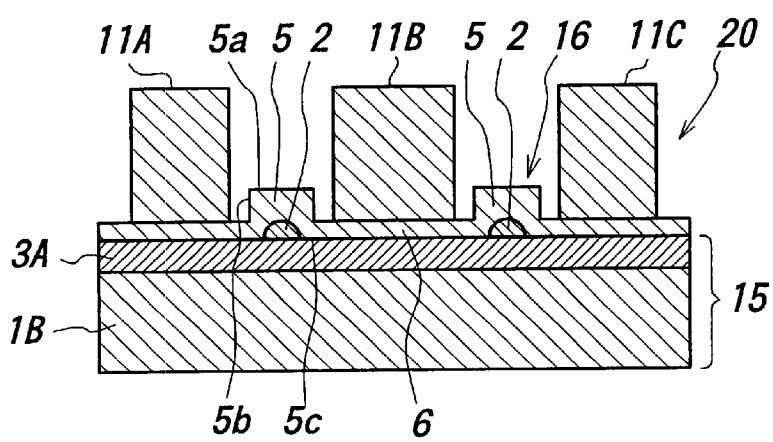

Next, after a plating underfilm (not shown) is formed, a thick resist layer 7 is formed so as to cover the surface of the ferroelectric single crystalline layer 16, as shown in FIG. 2(a). Then, electrodes 11A–11C are formed on the ferroelectric single crystalline layer 16 using a plating method, as shown in FIG. 2(b). Lastly, the thick resist layer 7 is removed, and a travelling wave-type optical modulator is fabricated, as shown in FIG. 2(c). FIG. 2(c) shows the cross section of a modulating region 20 of the travelling wave-type optical modulator.

The optical waveguides 2 can be fabricated by well known methods, such as a titanium diffusion method or a proton exchange method. The electrodes 11A–11C can be made of a material having lower resistance and excellent impedance performance, such as Au, Ag, or Cu. Moreover, the electrodes can be made using plating, deposition, and sputtering methods, for example. Moreover, a buffer layer made of silicon oxide, magnesium fluoride, silicon nitride or alumina may be provided.

EXAMPLE 1

The substrate 1A and the supporting substrate 1B were made of X-cut lithium niobate single crystal, and a travelling wave-type optical modulator was fabricated as shown in FIGS. 1 and 2. A titanium pattern was formed on a substrate 1A by photolithography and electron beam deposition, and thermally diffused at 1000–1050° C. under moisture-containing an oxide atmosphere to form the titanium diffusion type optical waveguides 2.

Then, adhesive layers 3, which are solder glass layers, were formed on substrates 1A and 1B to have a thickness of about 5 μm. Adhesive layers 3 were formed using sputtering or electron beam deposition methods. Then, as shown in FIG. 1(b), the solder glass layers were contacted and thermally treated at 500° C. under a given load being applied thereto. Since the deformation temperature of the solder glass is 500° C. or below, the solder glass layers were adhered by the above thermal treatment, as a result, the substrates 1A and 1B are adhered.

Subsequently, the substrate 1A was ground and polished, and then, CMP-treated by using polishing powders to complete the ferroelectric single crystalline layer 4 made of lithium niobate single crystal. Then, an aluminum pattern was aligned and formed immediately on the optical waveguide by photolithograpy and electron beam deposition. Then, the ferroelectric single crystalline layer 4 was etched via the aluminum pattern as a mask, to form the ferroelectric single crystalline layer 16 having thicker parts 5 and thinner parts 6. Thereafter, the aluminum pattern was removed.

Then, an underfilm for a gold plating, made of a Cr layer as an adhesive layer and a Au layer having a thickness of 5000 Å on the Cr layer, was formed by sputtering. Subsequently, a thick resist (commercially available) was formed, as a guiding layer for the gold plating, by photolithography, and then, a gold electrode was formed by electroplating. Thereafter, the resist layer was removed with an organic solvent and the underfilm was removed by wet-etching.

Then, the thus obtained wafer was cut into chips. The ends of each chip were optically polished to complete a travelling wave-type optical modulator. Thereafter, optical fibers were attached to the traveling wave-type optical modulator, using an ultraviolet cured resin, such that the optical axes of the optical fibers were aligned with the axes of the optical waveguide. The transmissive performance (S21) and reflective performance (S11) were measured by a network analyzer, and the microwave reflective index nm, the characteristic impedance Z and the electrode loss α were calculated. Then, the half wavelength voltage Vπ was measured as an electro-optic characteristic. Moreover, the optical insertion loss was measured.

Figure 3:
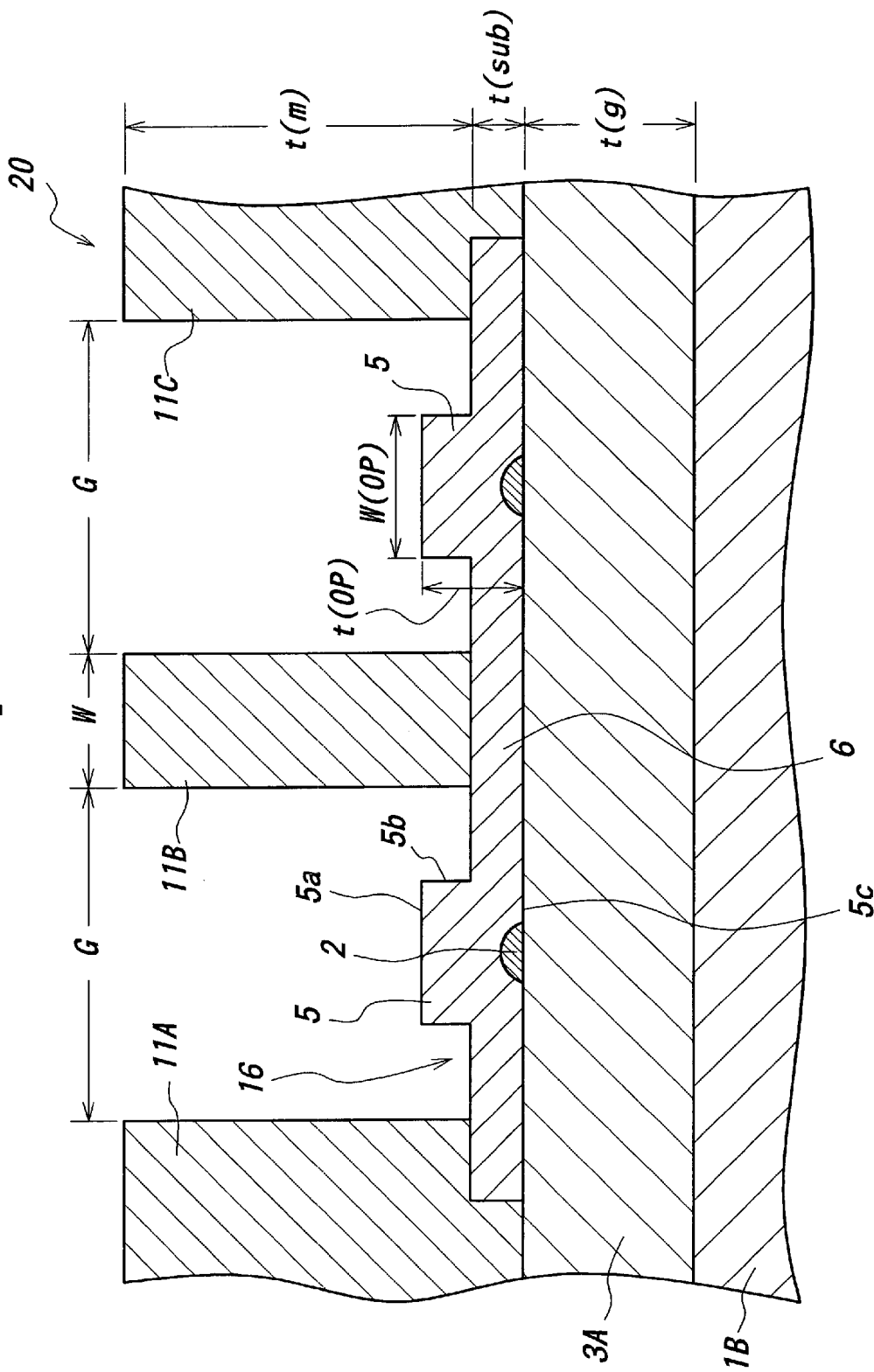
FIG. 3 is an enlarged cross sectional view showing a part of the travelling wave-type optical modulator in accordance with the present invention.

As shown in FIG. 3, the width W of the central electrode 11B was set to 8 μm, and the width W of the thickness t(OP) of the thicker part 5 was set to 6 μm. Then, the electrode gap G was set to 15, 20 and 25 μm. In this case, the thickness t(g) of the adhesive layer 3A, the thickness t(sub) of the thinner part 6, the electrode thickness t(m), the microwave refractive index nm, the characteristic impedance Z, the electrode loss a and the product Vπ·L of operating voltage Vπ by electrode length L were investigated. The thus obtained results are listed in FIG. 4.

Figure 4:
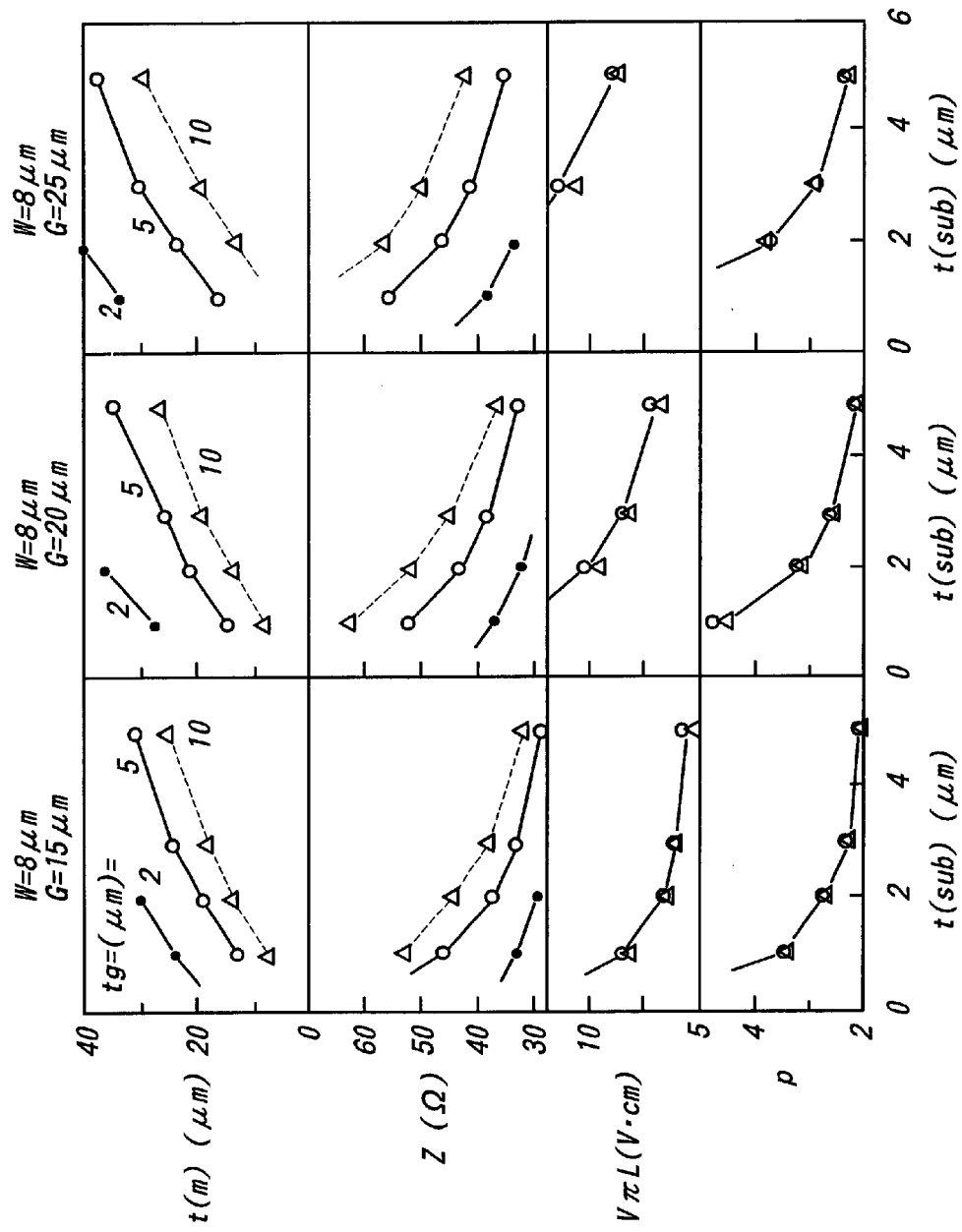
FIG. 4 is a graph showing the variations in the operating voltage V$\pi$, the electrode length L, the characteristic impedance Z and the electrode thickness t(m) at speed matching, with several parameters varied, of the travelling wave-type optical modulator shown in FIG. 3.

As is apparent from FIG. 4, in the above travelling wave-type optical modulator, the microwave refractive index can be matched to the optical wave refractive index. Particularly, on the condition of the electrode gap G=20 μm, the glass thickness tg=10 μm, the thinner part thickness t(sub)=3 μm, and the electrode thickness t(m)=19 μm, the velocity matching condition was able to be satisfied, and the characteristic impedance Z of 45Ω, the electrode loss a of 0.3 dB/cm·(GHz)$^{1/2}$ were able to be obtained. Moreover, the modulating band of the travelling wave-type optical modulator was 40 GHz. The product (Vπ·L) was 8.2 V·cm (the operating voltage Vπ=2.05V, the electrode length L=4 cm). Moreover, the optical insertion loss was 4 dB.

EXAMPLE 2

The substrate 1A and supporting substrate 1B were adhered with resin layers, made of epoxy-based resin film (dielectric constant=3.8), formed instead of the solder glass layers. At the time of adhesion, a load of 50 kgf/cm$^2$ was applied, and the resin layers were thermally treated at 170° C.

The thus obtained travelling wave-type optical modulator was evaluated as in Example 1. On the condition of the electrode gap G=20 μm, the resin thickness tg=25 μm, the thinner part thickness t(sub)=3 μm, and the electrode thickness t(m)=19 μm, the velocity matching condition was able to be satisfied, and the characteristic impedance Z of 45Ω, the electrode loss a of 0.3 dB/cm·(GHz)$^{1/2}$ were able to be obtained. Moreover, the modulating band of the travelling wave-type optical modulator was 40 GHz. The product (Vπ·L) was 8.2 V·cm (the operating voltage Vπ=2.05V, the electrode length L=4 cm). Moreover, the optical insertion loss was 4 dB.

COMPARATIVE Example 1

Except that the ferroelectric single crystalline layer was formed uniform without the thicker parts and the thinner parts, a travelling wave-type optical modulator was fabricated as shown in Example 1. The thickness t(sub) of the ferroelectric single crystalline layer was set to 3 μm. As a result, although the modulating band of 40 GHz was attained, the optical insertion loss was increased up to 10 dB.

EXAMPLE 3

Figure 5:
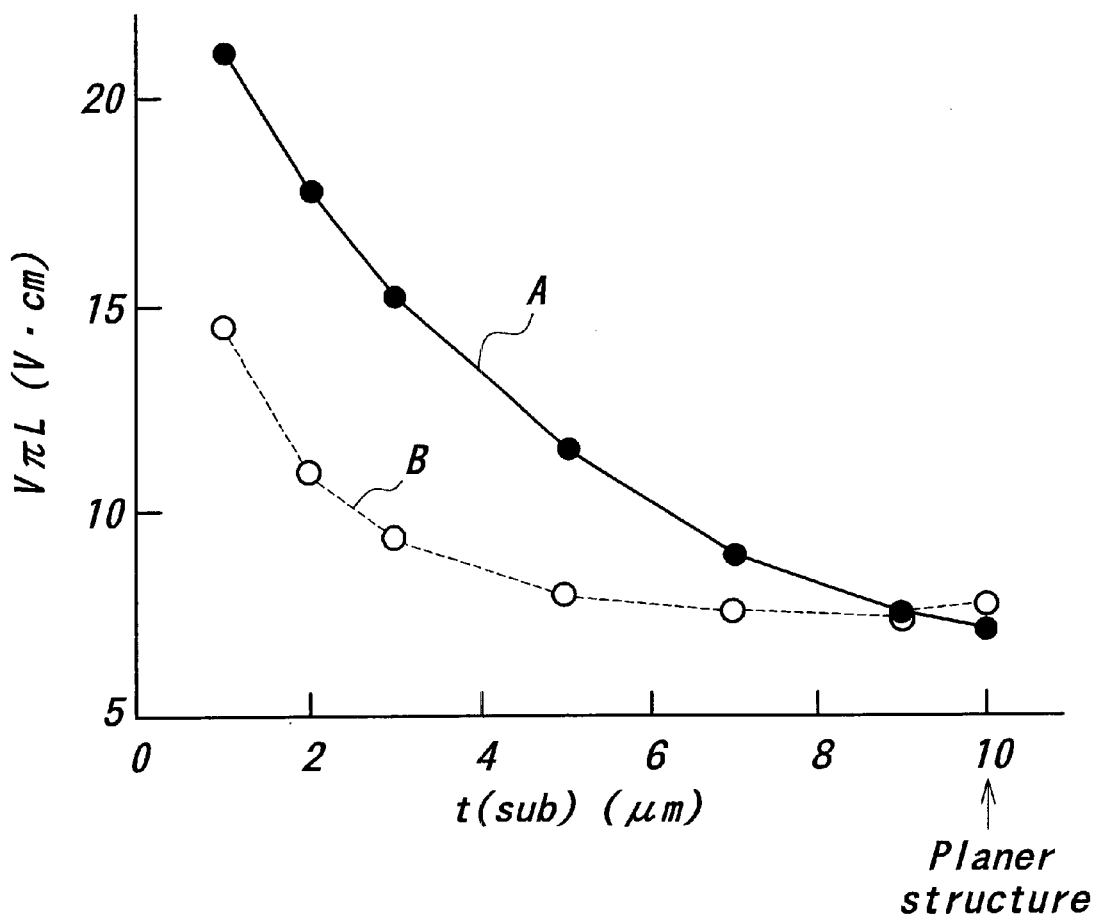
FIG. 5 is a graph showing the relation between the product (V$\pi$·L) of operating voltage V$\pi$ by electrode length L and the electrode thickness t(m) in the optical waveguide being formed in the upper area (A) or the lower part (B) of the thicker part of the ferroelectric single crystalline part of the travelling wave-type optical modulator shown in FIG. 3.

A traveling wave-type optical modulator was fabricated to satisfy the following: the width W of the central electrode 11B=8 μm; the width W(OP) of the thicker part 5=10 μm; the thickness t(OP) of the thicker part 5=6 μm; the electrode gap G=20 μm; the glass thickness t(g)=10 μm; and the electrode thickness t(m)=19 μm. Moreover, the thickness t(sub) of the thinner part was varied as shown in FIG. 5. In this case, the optical waveguide was formed in an adjacent area to the bottom surface 5c or the top surface 5a of the thicker part 5. The thus calculated and obtained product (Vπ·L) are shown in the graph in FIG. 5.

The graph B denotes the product (Vπ·L) in the case of forming the optical waveguide in the area adjacent to the bottom surface 5C, and the graph A denotes the product (Vπ·L) in the case of forming the optical waveguide in the area adjacent to the top surface 5a. As is apparent from FIG. 5, if the optical waveguide is formed in the area adjacent to the bottom surface 5c of the thicker part 5, the product (Vπ·L) is more decreased.

Another aspect of the traveling wave-type optical modulator in accordance with the present invention will be described below with reference to FIGS. 6–10.

Figure 6A:
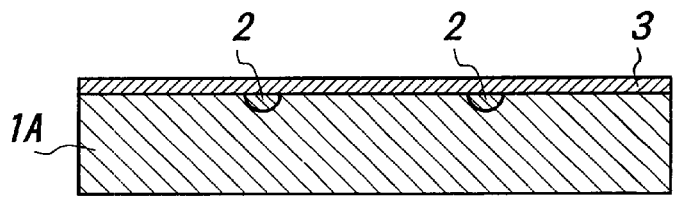
FIGS. 6(a)–(d) are cross sectional views schematically showing the manufacturing steps for another embodiment of the travelling wave-type optical modulator according to the present invention.

First, as shown in FIG. 6(a), optical waveguides 2 are formed on a substrate 1A made of a X-cut ferroelectric single crystal such that the long directions of the optical waveguides 2 are parallel to the Y-direction of the substrate. Therefore, a given TE mode optical wave travels through each optical waveguide in a direction parallel to the Y-direction of the substrate 1A.

Figure 6B:
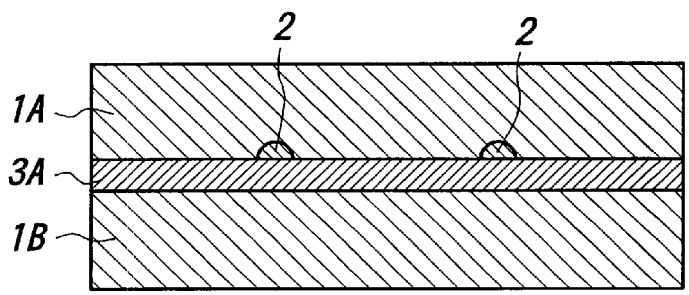

Then, adhesive layer 3, which is a solder glass layer, is formed on the substrate 1A. Another supporting substrate 1B is prepared, and another solder glass adhesive layer 3 is formed on the supporting substrate 1B. The solder glass layers 3 are adhered and thermally treated under a given load being applied thereto, to adhere the substrate 1A and the supporting substrate 1B to each other, as shown in FIG. 6(b). Numeral reference 3A designates an adhesive layer made of the bonded adhesive layers 3.

Figure 6C:
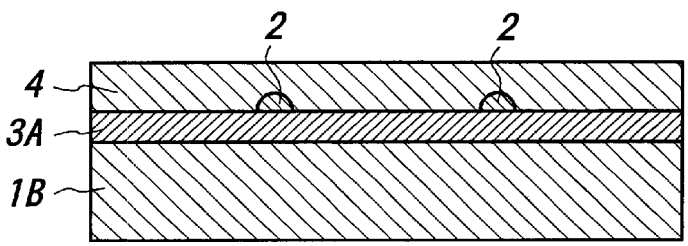
Figure 6D:
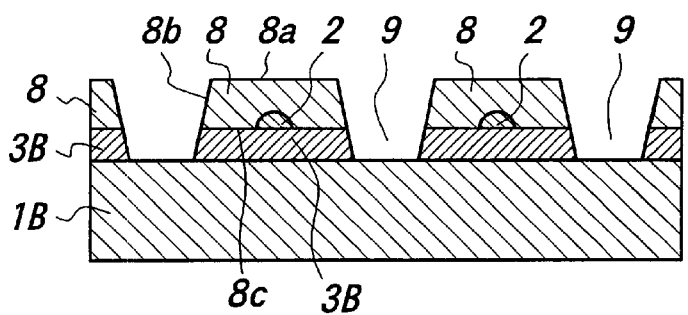
Figure 7A:
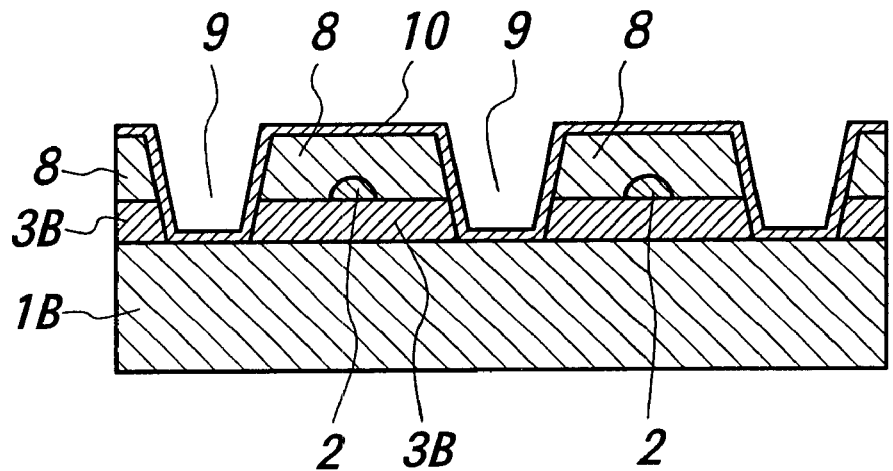
FIGS. 7(a)–(b) are cross sectional views schematically showing the manufacturing steps subsequent to FIGS. 6(a)–(d) for the travelling wave-type optical modulator in accordance with the present invention.

Then, the top surface of the substrate 1A in which the optical waveguide was formed is ground and polished, thereby to form a thinner ferroelectric single crystalline layer 4, as shown in FIG. 6(c). Subsequently, the ferroelectric single crystalline layer 4 and the solder glass layer 3 are partially removed to expose the surface of the substrate 1B, thereby to form ferroelectric single crystalline portions 8 separately. In this case, a given space 9 is formed between the adjacent ferroelectric single crystalline portions 8. Then, as shown in FIG. 7(a), an amorphous silicon film 10 is formed so as to cover the surface of each ferroelectric single crystalline portion 8 and the exposed surface of the substrate 1B.

Figure 7B:
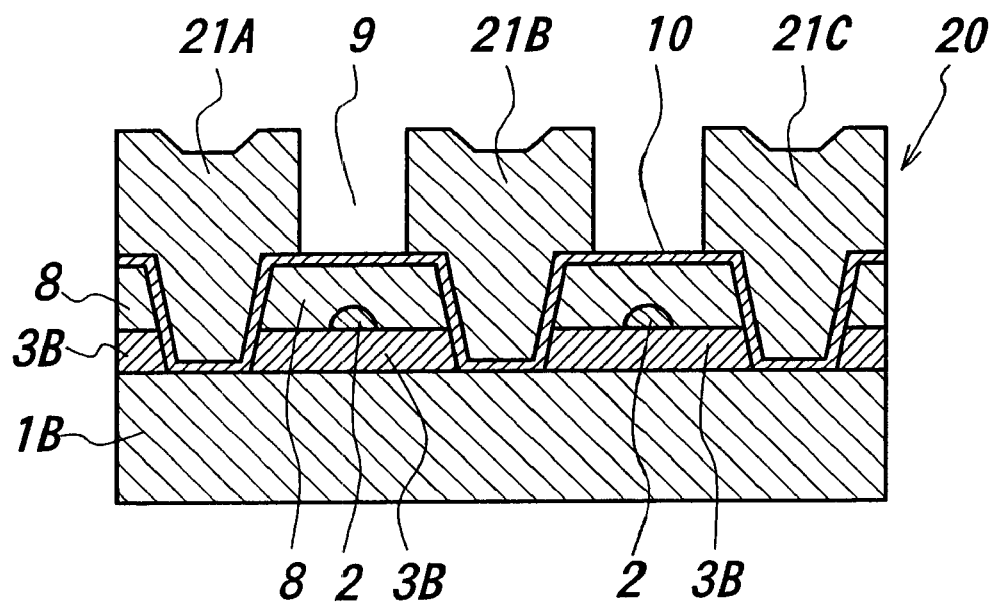
Figure 8:
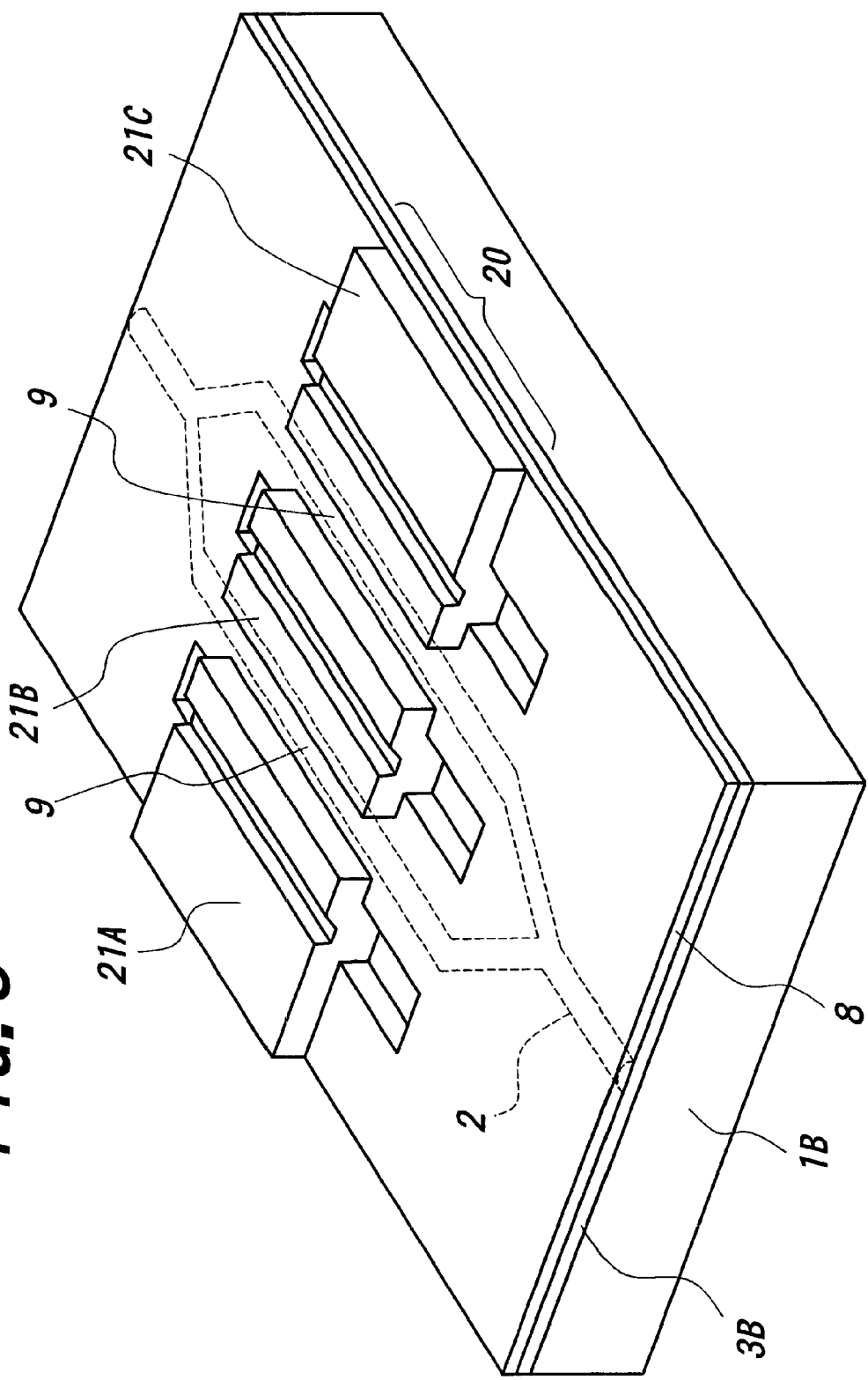
FIG. 8 is a perspective view showing the travelling wave-type optical modulator manufactured as shown FIGS. 6 and 7.

Then, after a plating underfilm (not shown) is formed, a thick resist layer is formed, and thereafter, electrodes 21A–21C are formed on the substrate by plating. Next, the thick resist layer is removed with an organic solvent, and the plating underfilm is removed by wet-etching to complete a travelling wave-type optical modulator as shown in FIG. 7(b). FIG. 8 is a perspective view showing the travelling wave-type optical modulator. In this embodiment, the travelling wave-type optical modulator is a Mach-Zehnder type modulator. FIG. 7(b) corresponds to the cross section of the modulating region 20 of the travelling wave-type optical modulator, which is perpendicular to the long direction of the optical waveguide 2.

Figure 9:
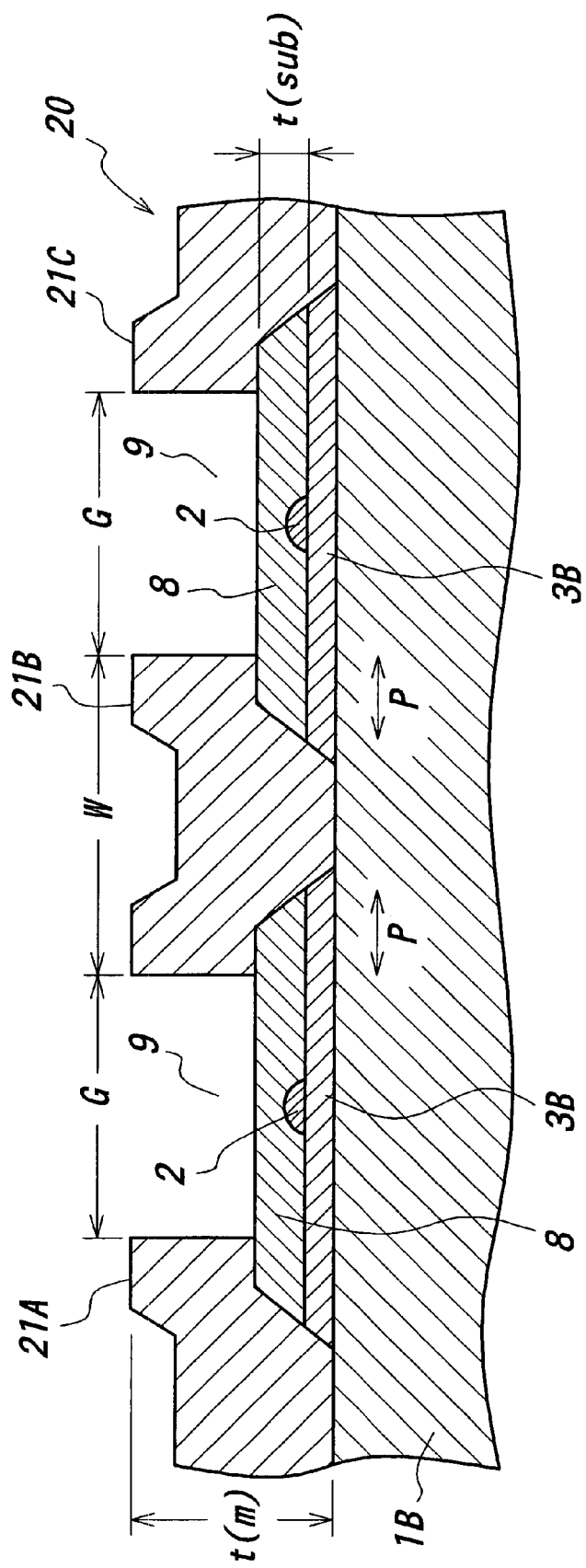
FIG. 9 is an enlarged cross sectional view showing a part of the travelling wave-type optical modulator shown in FIG. 8.

FIG. 9 is an enlarged cross sectional view showing a part of the travelling wave-type optical modulator. As is apparent from FIG. 9, the electrodes 21A, 21B and 21C are arranged to be even for the optical waveguides 2 (positioned at the same level from the surface of the substrate 1B) and large effective voltages are applied to the optical waveguides 2 through the ferroelectric single crystalline portions 8. Therefore, the product Vπ·L can be remarkably decreased.

EXAMPLE 4

In this example, according to the manufacturing steps shown in FIGS. 6 and 7, a travelling wave-type optical modulator having the modulating region shown in FIG. 9 was be fabricated. Concretely, a titanium pattern was formed on a substrate 1A made of a X-cut lithium niobate single crystal by photolithography and electron beam deposition, and thermally diffused at 1000–1050° C. under a moisture-containing oxide atmosphere, thereby to fabricate a titanium diffusion type optical waveguides 2.

Then, an amorphous silicon film was formed to have a thickness of 500 Å on the substrate 1A by sputtering, and preferably, a solder glass layer 3 was formed to have a thickness of 1000 Å successively in the same batch. Another supporting substrate 1B was prepared, and a solder glass 3 was formed to have a thickness of 1000 Å on the supporting substrate 1B by sputtering. Then, the solder glass layers 3 were contacted and thermally treated at 500° C. under a given load being applied thereto to adhere the substrates 1A and 1B. In this case, the deformation temperature of the solder glass was 500° C. and below. The supporting substrate 1B was made of a glass substrate [Bk-7] having substantially the same thermal expansion coefficient as that of the X-cut lithium niobate. As above mentioned, since the supporting substrate 1B was adhered to the substrate 1A made of the ferroelectric single crystal of lithium niobate, the thus obtained assembly can have a relatively large strength against the post-processing.

Then, the substrate 1A was ground and polished to form a ferroelectric single crystalline layer 4 made of the lithium niobate. Then, the ferroelectric single crystalline layer 4 was CMP-treated by polishing powders made of colloidal silica to remove the damaged area of the surface layer. Then, the ferroelectric single crystalline layer 4 and the solder glass layer 3A made of the bonded solder glass layers 3 were partially etched by KrF excimer laser so as to expose the surface of the supporting substrate 1B, thereby to fabricate ferroelectric single crystalline portions 8. Thereafter, an amorphous silicon film was formed in a thickness of 1500 Å to cover the ferroelectric single crystalline portions 8 and the exposed surface of the supporting substrate 1B, and an adhesive Cr film layer was formed in a thickness of 500 Å successively in the same batch. Then, an Au plating film underfilm was formed in a thickness of 300 Å on the Cr film. A thick resist layer (commercially available) was formed as a guiding layer for the gold plating, and Au electrodes were fabricated by electro-plating. Thereafter, the thick resist layer was removed by an organic solvent, and the Au layer and Cr layer were removed by wet-etching.

The thus obtained wafer was cut into chips. The ends of each chip were optically polished to complete a travelling wave-type optical modulator. Thereafter, optical fibers were attached to the traveling wave-type optical modulator, using ultraviolet cured resin, such that the optical axes of the optical fibers were aligned with the axes of the channels of the optical waveguide. The transmissive performance (S21) and reflective performance (S11) were measured by a network analyzer, and the microwave reflective index nm, the characteristic impedance Z and the electrode loss a were calculated. Then, the half wavelength voltage Vπ was measured as an electro-optic characteristic. Moreover, the optical insertion loss was measured.

The microwave refractive index can be matched to the optical wave re-fractive index (nm=no=2.05) at the width W of the central electrode 21B=30–40 μm, the thickness t(sub) of each ferroelectric single crystalline portion 8=6–10 μm, the electrode gap G=30–40 μm, and the thickness t(m) of the electrode=15–45 μm.

Particularly, on the condition of the width W of the central electrode 21B=40 μm, the thickness t(sub) of each ferroelectric single crystalline portion 8=6 μm, the electrode gap G=30 μm, and the thickness t(m) of the electrode=19 μm, the velocity matching condition can be satisfied, and the characteristic impedance Z of 47Ω, the electrode loss α of 0.18 dB/cm·(GHz)$^{1/2}$ were able to be obtained. Moreover, the modulating band of the travelling wave-type optical modulator was up to 80 GHz. The product (Vπ·L) was 9 V·cm (the operating voltage Vπ=2.25V, the electrode length L=4 cm). Moreover, the optical insertion loss was 5 dB.

In a preferred embodiment of this aspect of the travelling wave type optical modulator according to the present invention, the ferroelectric single crystalline portion has a thicker part and a thinner part. An electrode is provided on the thinner part between the thicker parts of the adjacent ferroelectric single crystalline portions. In this case, the optical insertion loss can be more reduced.

Figure 10:
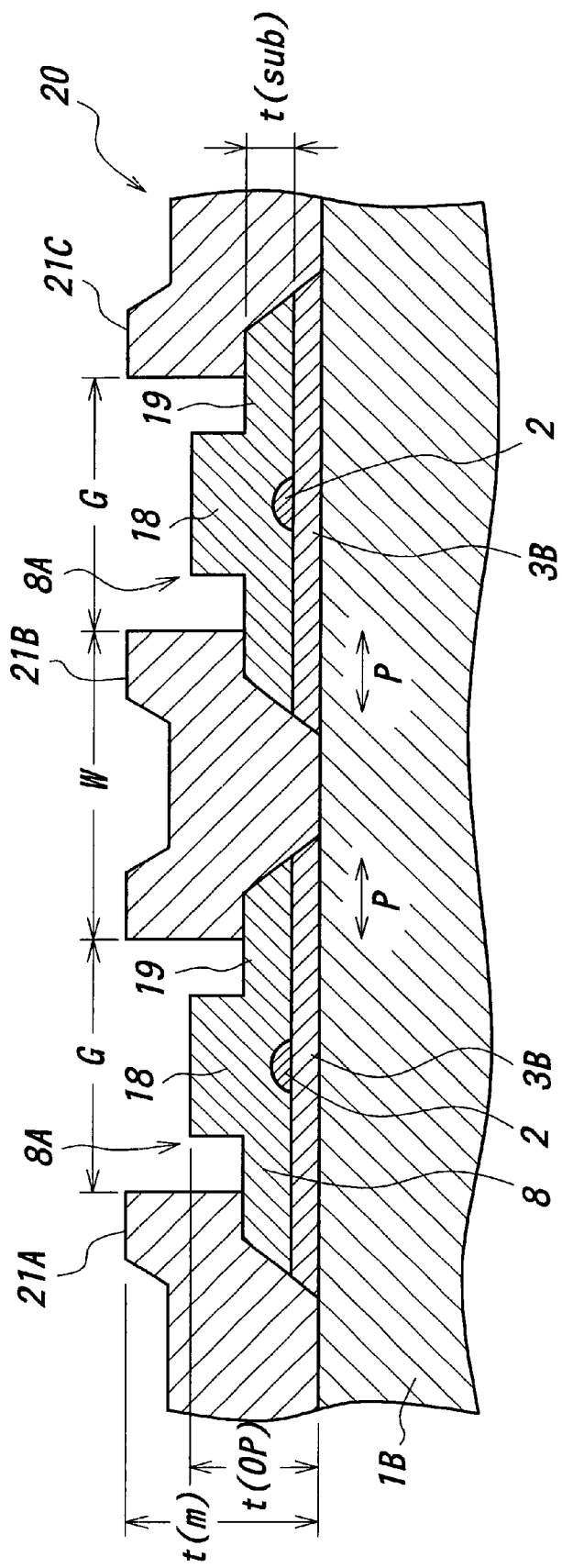
FIG. 10 is an enlarged cross sectional view showing yet another embodiment of the travelling wave-type optical modulator in accordance with the present invention.

FIG. 10 is a cross sectional view schematically showing a preferred embodiment of an aspect of a travelling wave-type optical modulator in accordance with the present invention. Fundamentally, the travelling wave-type optical modulator has a similar structure to the one as shown in FIG. 9, except that the ferroelectric single crystalline portion 8A has the thicker part 18 and the thinner part 19.

EXAMPLE 5

A travelling wave-type optical modulator as shown in FIG. 10 was fabricated in almost the same manner as in Example 3. The substrate 1A made of the lithium niobate was ground and polished so as to set the thickness to 10 μm. Then, the substrate 1A was partially etched by KrF excimer laser as mentioned above, to fabricate the ferroelectric single crystalline portions 8A. The thicker and thinner parts were formed by adjusting the laser output and the scanning number. Then, an amorphous silicon layer and Au electrodes were fabricated.

The thus obtained wafer was cut into chips. The ends of each chip were optically polished to complete a travelling wave-type optical modulator. Thereafter, optical fibers were attached to the traveling wave-type optical modulator, using ultraviolet cured resin, such that the optical axes of the optical fibers were aligned with the axes of the channels of the optical waveguide. The transmissive performance (S21) and reflective performance (S11) were measured by a network analyzer, and the microwave reflective index nm, the characteristic impedance Z and the electrode loss a were calculated. Then, the half wavelength voltage Vπ was measured as an electro-optic characteristic. Moreover, the optical insertion loss was measured.

The microwave refractive index was able to be matched to the optical wave refractive index (nm=no=2.15) at the width W of the central electrode 21B=30–40 μm, the thickness t(sub) of the thinner part 19 of each ferroelectric single crystalline portion 8=6–10 μm, the electrode gap G=30–40 μm, and the thickness t(m) of the electrode=15–45 μm.

Particularly, on the condition of the width W of the central electrode 21B=40 μm, the thickness t(sub) of the thinner part 19 of each ferroelectric single crystalline portion 8A=6 μm, the thickness t(OP) of the thicker part 18 of each ferroelectric single crystalline portion 8A=10 μm, the electrode gap G=30 μm, and the thickness t(m) of the electrode=19 μm, the velocity matching condition was able to be satisfied, and the characteristic impedance Z of 45Ω, the remarkably reduced electrode loss α of 0.18 dB/cm·(GHz)$^{1/2}$ were able to be obtained. Moreover, the modulating band of the travelling wave-type optical modulator was up to 80 GHz. The product (Vπ·L) was 9.5 V·cm. Moreover, the optical insertion loss was 4 dB.

Although the present invention was described in detail with reference to the above examples, the invention is not limited to the above disclosure and variations and modifications may be made without departing from the scope of the present invention.

According to the present invention, a travelling wave-type optical modulator is provided including a ferroelectric single crystal substrate having thicker and thinner parts, which allows the optical insertion loss to be decreased while maintaining the velocity matching for a microwave signal and the impedance matching for an external circuit. Moreover, the product (Vπ·L) of operating voltage Vπ by electrode length L can be greatly decreased while maintaining the velocity matching for a microwave signal and the impedance matching for an external circuit.

What is claimed is:

1. A travelling wave-type optical modulator, comprising:
   a supporting substrate;
   a ferroelectric single crystalline layer positioned on the supporting, and having thicker parts and thinner parts within the modulating region of the travelling wave-type optical modulator when viewed in the cross section of the modulating region;
   an optical waveguide formed in the bottom area of the thicker part adjacent to the supporting substrate, and
   electrodes for modulation, each of the electrodes being provided on the thinner part of the ferroelectric single crystalline layer between the adjacent thicker parts;
   wherein the position of the optical waveguide decreases the product (Vπ·L), with Vπ being operating voltage and L being electrode length.

2. A travelling wave-type optical modulator as defined in claim 1, wherein the supporting substrate includes a base substance comprising a hard material and an adhesive layer on the base substance to adhere the ferroelectric single crystalline layer.

3. A travelling wave-type modulator as defined in claim 2, wherein the adhesive layer is made of glass material or resin material.

4. A travelling wave-type optical modulator as defined in claim 3, wherein the adhesive layer comprises a glass solder.

5. A method for manufacturing a travelling wave-type optical modulator, comprising the steps of:
   preparing a substrate comprising a ferroelectric single crystalline material;
   forming an optical waveguide in the substrate;
   adhering the substrate to a supporting substrate;
   processing the substrate to form thicker parts and thinner parts, when viewed in the cross section of the modulating region, within the modulating region of the travelling wave-type optical modulator, and positioning the optical waveguide in the bottom area of the thicker part adjacent the supporting substrate; and
   providing electrodes for modulation, each of the electrodes being positioned on the thinner part between the adjacent thicker parts of the ferroelectric single crystalline layer;
   wherein the position of the optical waveguide decreases the product (Vπ·L), with Vπ being operating voltage and L being electrode length.

6. A manufacturing method as defined in claim 5, wherein the substrate is adhered to the supporting substrate by adhering the adhesive layers formed on the substrate and the supporting substrate to one another.

7. A manufacturing method as defined in claim 6, wherein each adhesive layer is made of a glass material or a resin material.

8. A manufacturing method as defined in claim 7, wherein each adhesive layer comprises a glass solder.

9. A travelling wave-type optical modulator, comprising:
   a supporting substrate;
   ferroelectric single crystalline portions positioned on the supporting substrate, each of the ferroelectric single crystalline portions being separated within the modulating region of the travelling wave-type optical modulator when viewed in the cross section of the modulating region;
   an optical waveguide formed in the bottom area of the ferroelectric single crystalline portion adjacent the supporting substrate; and electrodes for modulation, each of the electrodes being provided between adjacent ferroelectric single crystalline portions on the supporting substrate;

wherein the position of the optical waveguide decreases the product (Vπ·L), with Vπ being operating voltage and L being electrode length.

10. A travelling wave-type optical modulator as defined in claim 9, wherein each electrode contacts at least the side surfaces of adjacent ferroelectric single crystalline portions.

11. A travelling wave-type optical modulator as defined in claim 10, wherein each electrode contacts the top surface of adjacent ferroelectric single crystalline portions.

12. A travelling wave-type optical modulator as defined in claim 9, wherein each ferroelectric single crystalline portion has a thicker part and a thinner part, and each electrode is provided on the thinner parts between the thicker parts of adjacent ferroelectric single crystalline portions.

13. A travelling wave-type optical modulator as defined in claim 9, wherein the supporting substrate includes a base substance comprising a hard material and an adhesive layer on the base substance to adhere the ferroelectric single crystalline layer.

14. A travelling wave-type optical modulator as defined in claim 13, wherein the adhesive layer comprises a glass material or a resin material.

15. A travelling wave-type optical modulator as defined in claim 14, wherein the adhesive layer comprises a glass solder.

16. A travelling wave-type optical modulator as defined in claim 9, wherein the supporting substrate comprises a glass material or a resin material entirely.

17. A method for manufacturing traveling wave-type optical modulator comprising the steps of:

preparing a substrate comprising a ferroelectric single crystalline material;

forming an optical waveguide in the substrate;

adhering the substrate to a supporting substrate;

processing the substrate to fabricate ferroelectric single crystalline portions, each of the ferroelectric single crystalline portions being separated within the modulating region of the travelling wave-type optical modulator when viewed in the cross section of the modulating region, and forming the optical waveguide in the bottom area of the ferroelectric single crystalline portion adjacent the supporting substrate; and providing electrodes for modulation, each of the electrodes being positioned between adjacent ferroelectric single crystalline portions;

wherein the position of the optical waveguide decreases the product (Vπ·L), with Vπ being operating voltage and L being electrode length.

18. A manufacturing method as defined in claim 17, wherein each electrode contacts at least the side surfaces of the adjacent ferroelectric single crystalline portions.

19. A manufacturing method as defined in claim 18, wherein each electrode contacts the top surface of the adjacent ferroelectric single crystalline portions.

20. A manufacturing method as defined in claim 17, further comprising the step of forming a thicker part and a thinner part in each ferroelectric single crystalline portion when processing the substrate, and each electrode is provided on the thinner parts between the thicker parts of adjacent ferroelectric single crystalline portions.

21. A manufacturing method as defined in claim 17, wherein the supporting substrate includes a base substance comprising a hard material and an adhesive layer on the base substance to adhere the ferroelectric single crystalline layer.

22. A manufacturing method as defined in claim 21, wherein the substrate is adhered to the supporting substrate by adhering the adhesive layers formed on the substrate and the supporting substrate to one another.

23. A manufacturing method as defined in claim 22, wherein each adhesive layer comprises a glass material or a resin material.

24. A manufacturing method as defined in claim 23, wherein each adhesive layer comprises a glass solder.

25. A manufacturing method as defined in claim 22, wherein after an amorphous silicon film is formed on the substrate, the adhesive layer is formed on the substrate via the amorphous silicon film.

26. A manufacturing method as defined in claim 25, wherein the amorphous silicon film and the adhesive layer are formed in the same batch.

27. A manufacturing method as defined in claim 17, wherein the substrate is processed by excimer laser to fabricate the ferroelectric single crystalline portions.

28. A manufacturing method as defined in claim 27, wherein a Au plating film is formed to cover the processed surface of the substrate by the excimer laser, and the Au plating film is processed to form the electrodes.

* * * * *

UNITED STATES PATENT AND TRADEMARK OFFICE
CERTIFICATE OF CORRECTION

PATENT NO. : 6,674,565 B2
DATED : January 6, 2004
INVENTOR(S) : Atsuo Kondo et al.

It is certified that error appears in the above-identified patent and that said Letters Patent is hereby corrected as shown below:

Column 10,
Line 5, please add -- substrate -- after "supporting"
Line 10, please delete "to"

Column 11,
Line 32, please add -- a -- after "manufacturing"

Column 12,
Line 11, please delete "the"
Line 13, please delete "the" (second occurrence)
Line 46, please delete "the" (second occurrence)

Signed and Sealed this

Thirtieth Day of March, 2004

JON W. DUDAS
*Acting Director of the United States Patent and Trademark Office*